July 30, 1968  J. E. McKEE ET AL  3,394,525
MOCK-UP STRUCTURAL UNITS

Filed Sept. 2, 1965  3 Sheets-Sheet 1

INVENTOR
James E. McKee
Donald R. McKee
Charles F. McKee

BY Cecil L. Wood

ATTORNEY

July 30, 1968
J. E. McKEE ET AL
3,394,525
MOCK-UP STRUCTURAL UNITS
Filed Sept. 2, 1965
3 Sheets-Sheet 2
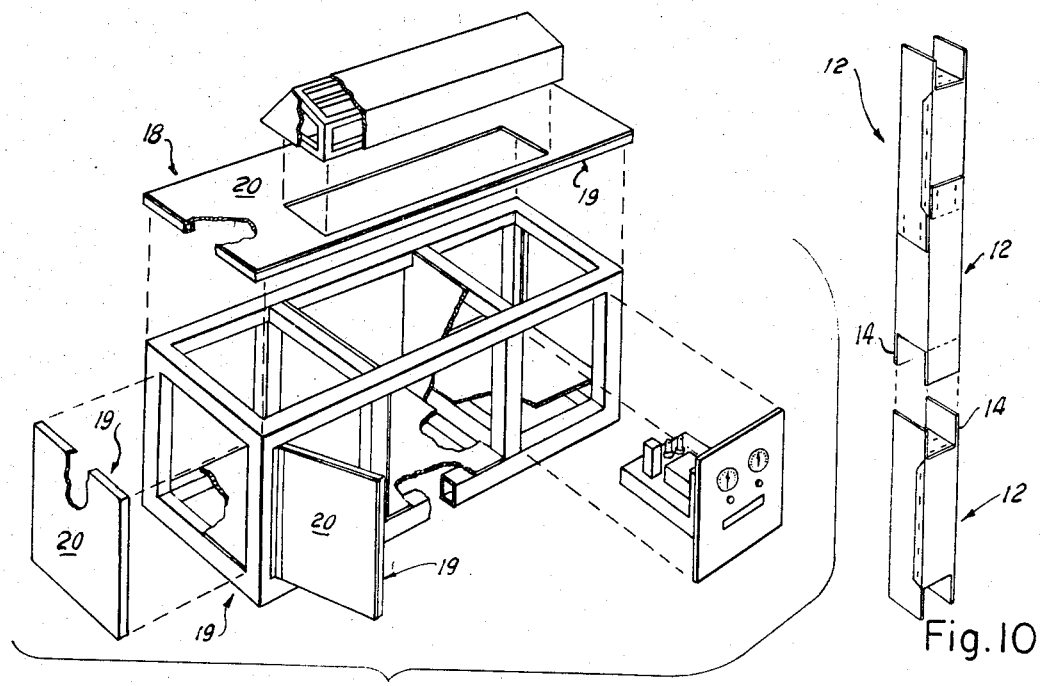
Fig. 9
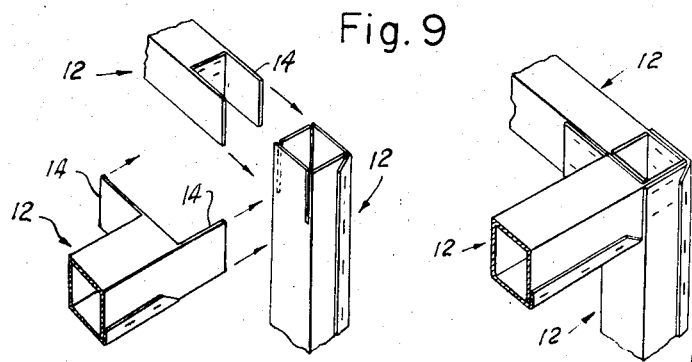
Fig.10
Fig.11
Fig.12
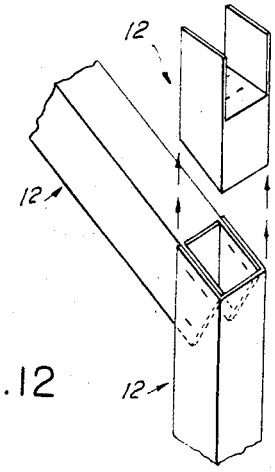
Fig.13
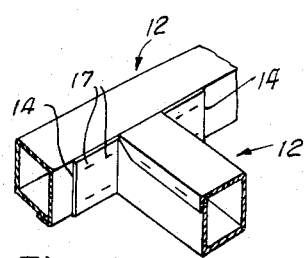
Fig.14
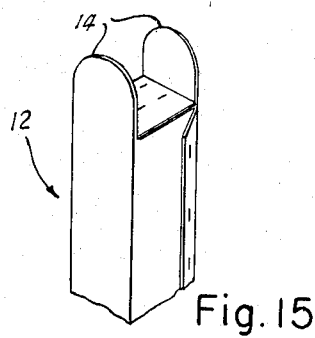
Fig.15
INVENTOR
James E. McKee
Donald R. McKee
Charles F. McKee
BY *Cecil L. Wood*
ATTORNEY July 30, 1968   J. E. McKEE ET AL   3,394,525
MOCK-UP STRUCTURAL UNITS Filed Sept. 2, 1965   3 Sheets-Sheet 3

INVENTOR
James E. McKee
Donald R. McKee
Charles F. McKee

BY  *Cecil L. Poole*

ATTORNEY

:::::::::::::::::::::::::::::::::::::::::::::::::::::

United States Patent Office 3,394,525
Patented July 30, 1968

---

3,394,525
MOCK-UP STRUCTURAL UNITS
James E. McKee, Donald R. McKee, and Charles F. McKee, all of 3119 Milton, Dallas, Tex. 75205
Filed Sept. 2, 1965, Ser. No. 484,588
1 Claim. (Cl. 52—726)

ABSTRACT OF THE DISCLOSURE

The invention, in summary, is concerned with the provision of a method of producing a variety of mock-up units for assembly into such structures as buildings, articles of furniture, such as cabinets, and the like, and other items of proposed construction which can be embodied into a visual integration by which the projected structure can be adequately represented and comprehended as to its appearance and practical application.

The mock-up units are formed of heavy cardboard or pulp-board folded into a variety of box-like shapes and fastened by any desired means, as by stapling, whereby the units can assume a tubular form, rectangular in transverse section, capable of being assembled in longitudinal or angular association to simulate structural framing.

It is contemplated that the units can be expeditiously formed from cardboard or pulp-board stock which has been scribed or imprinted with a pattern or grid markings whereby to provide a guide for cutting and folding the material into a unit of predetermined dimension and shape, and having overlapping extensions for associating each unit with another like unit.

Summary of the invention

This invention relates to a method of forming simulated structures from heavy cardboard, and it has particular reference to a method of forming models or mock-ups, either of actual size or on a reduced scale, of various structures, such as articles of furniture, buildings, and the like, from sheet material such as heavy cardboard.

The invention has for its primary object the provision of an elongated tubular unit, rectangular in transverse section, and formed of materials such as heavy cardboard, and having end portions or flaps on opposing planar sides which extend beyond the polygonal body of the unit whereby to overlie and be secured to opposing sides of like units in a variety of angular arrangements with respect to said like units, or in axial alignment therewith, as desired, to simulate structural framing, including right-angular, obtuse- and acute-angular arrangements.

Another object of the invention is that of providing an economical and easy means by which a structural design can be fabricated to represent a projected building, or other structure, and enable the provision of a three-dimensional visualization thereof.

A further object of the invention resides in the provision of a structural unit which can be fabricated and assembled with other like units, with a minimum of effort and with a few inexpensive tools.

While the foregoing objects are paramount, other and lesser objects will become apparent as the description proceeds, when considered in connection with the appended drawings wherein.

Figure 5:
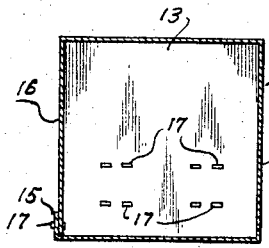
FIGURE 5 is a transverse sectional view taken on the line 5—5 of FIGURE 4.
Figure 6:
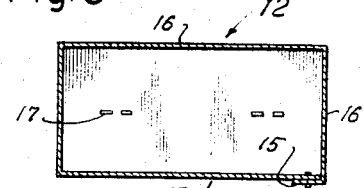
Figure 7:
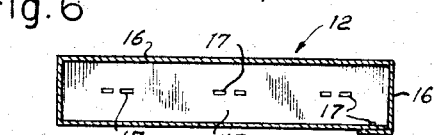
Figure 8:
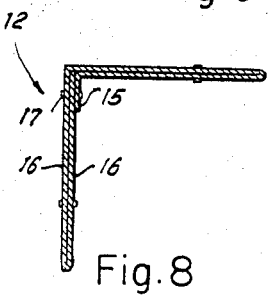

FIGURES 6, 7, and 8 are views similar to FIGURE 5 showing different forms of the invention.

FIGURE 9 is an exploded perspective view, partly broken away to show details of construction, of a simulated structure fabricated in accordance with the invention.

FIGURES 10 to 14 are fragmentary perspective views on an enlarged scale showing a variety of different arrangements for connecting like box-like pieces to each other in accordance with the invention.

FIGURE 15 is a fragmentary perspective view on an enlarged scale showing an end portion of one of the box-like pieces in which the end tabs have rounded edges.

Figure 16:
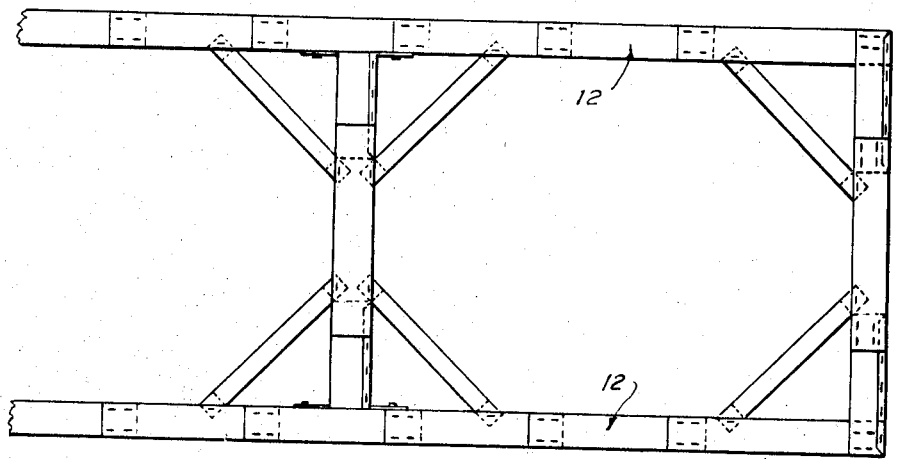

FIGURE 16 is a fragmentary view showing one side of a frame structure in which a plurality of box-like pieces are employed as frame members in accordance with the invention.

Figure 17:
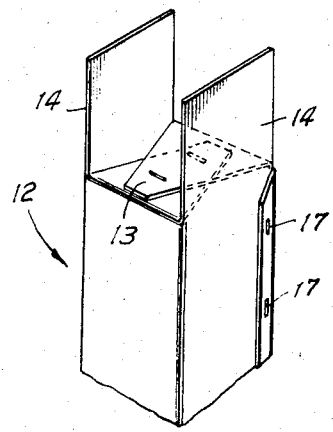

FIGURE 17 is a fragmentary perspective view on an enlarged scale showing an end portion of one of the box-like pieces in which opposite sides of the end flaps are cut away whereby said end flaps are substantially V shaped.

Figure 18:
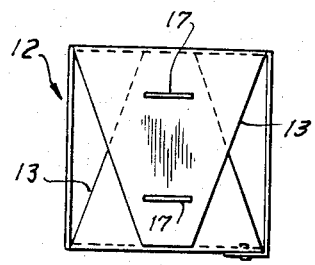

FIGURE 18 is an end view of the box-like piece shown in FIGURE 17.

Figure 19:
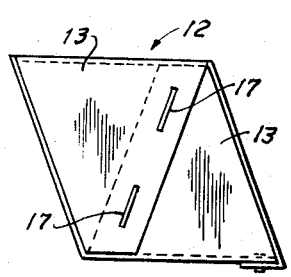
Figure 20:
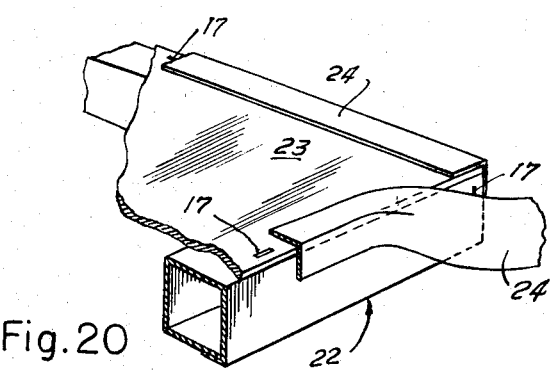

FIGURE 19 is a view similar to FIGURE 18 showing a box-like piece having differently shaped end flaps, and FIGURE 20 is a fragmentary perspective view on an enlarged scale showing a corner portion of a frame structure having frame members formed of box-like pieces and having a planar piece secured to one side of said frame structure in accordance with the invention, showing the staples whereby the pieces are connected and trim strips overlying said staples.

Figure 1:
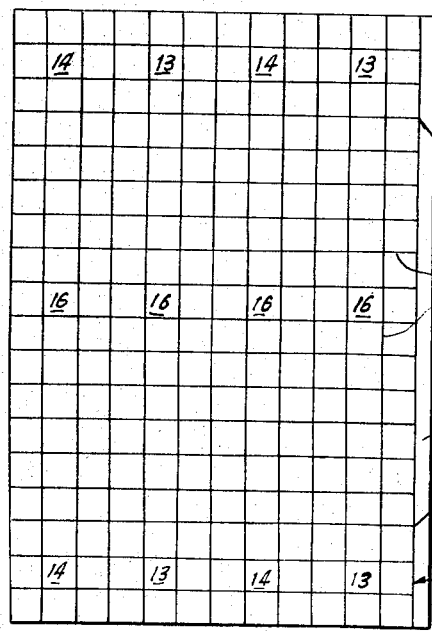
FIGURE 1 shows one side of a sheet of cardboard material suitable for use in forming the planar and box-like pieces of the invention, showing the guide lines thereon and showing the outline of a box-like piece as applied thereto, showing in solid lines the cut lines thereof and showing the fold lines in broken lines.
Figure 3:
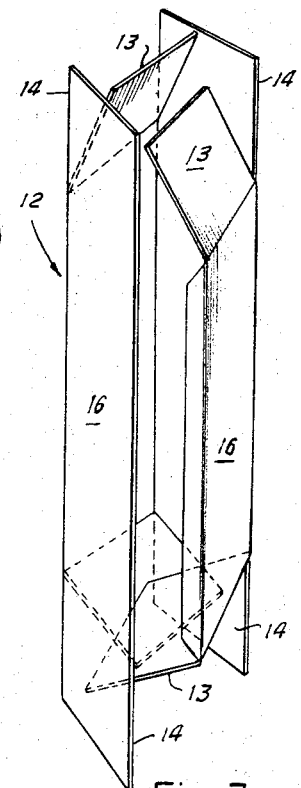
FIGURE 3 shows one of the box-like pieces in its partly folded position.
Figure 4:
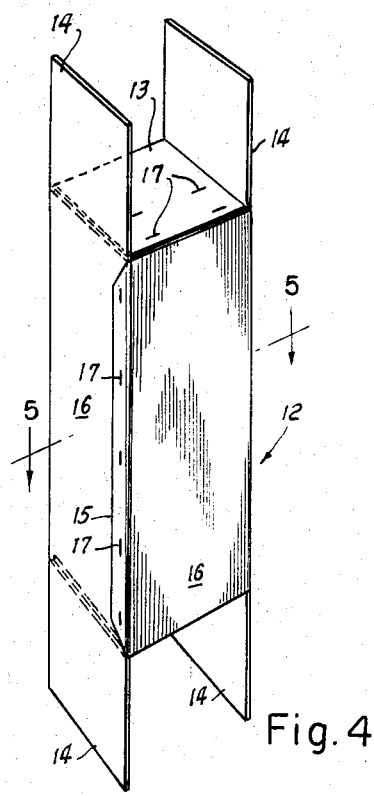
FIGURE 4 is a view similar to FIGURE 3 showing the box-like piece folded and stapled.

Referring to FIGURE 1 of the drawing, the numeral 10 designates generally a sheet of cardboard material having guide lines, indicated generally by the numeral 11, applied to one side thereof, and also having applied thereto the outline of a blank, indicated generally by the numeral 12, adapted in its cut and folded position to form a box-like piece 12 as hereinafter described, as illustrated in FIGURES 3 to 5.

Figure 2:
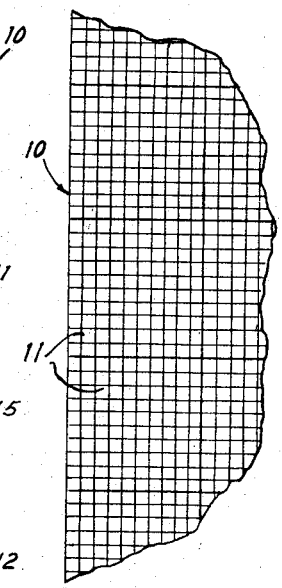
FIGURE 2 is a frgamentary view showing a sheet of cardboard material similar to the material shown in FIGURE 1 in which relatively heavier guide lines are employed at regularly spaced intervals.

The guide lines 11, shown in FIGURES 1 and 2, consist solely of two sets of parallel, uniformly spaced lines which intersect each other at right angles. FIGURE 2 shows an arrangement in which every tenth guide line 11 is relatively heavier.

In accordance with the invention the box-like piece 12, shown in FIGURES 3 to 5, has two pairs of end flaps 13 which extend longitudinally beyond its ends, on two opposite sides thereof, for folded, mutually overlapping engagement with each other, whereby its ends are closed, and has two pairs of end tabs 14 which extend longitudinally beyond its ends, on two other sides thereof, for overlying engagement with other like pieces whereby said pieces are adapted to be connected to each other, as shown in FIGURES 10 to 14.

The box-like piece 12 has a comparatively narrow, longitudinally extending side flap 15 which is continuous with one of the sides 16 thereof, for overlying engagement with an adjacent marginal portion of another side 16 thereof, whereby the piece 12 is secured in its folded position.

As shown best in FIGURES 4 and 5, the side flap 15 of the box-like piece 12 is connected in folded, overlying engagement with an adjacent marginal portion of an adjoining side 16 thereof, and the end flaps 13 are connected in folded, mutually overlapping engagement with each other, by means of staples, indicated by the numerals 17. As shown in FIGURES 10 to 14, the end tabs 14 are connected in folded or longitudinally extended, overlying engagement with opposing surfaces of other like pieces 12, by means of staples 17.

FIGURE 9 shows a simulated structure, indicated generally by the numeral 18, having frame portions 19 which advantageously may be constructed of box-like pieces corresponding to the pieces 12, said frame portion 19, having planar pieces 20 applied to one side thereof.

FIGURE 16 shows a frame structure 21 which corresponds to the frame portions 19 shown in FIGURE 9, showing the individual box-like pieces 12 as incorporated therein.

FIGURE 20 shows a corner portion of a frame 22, which corresponds to the frame portions 19 shown in FIGURE 9 and the frame structure 21 shown in FIGURE 16, and which advantageously may be formed of box-like pieces such as the piece 12 and has a planar piece 23, which corresponds to the planar pieces 20 shown in FIGURE 9, secured to one side thereof by means of staples 17. A trim strip 24 is used to cover the staples 17.

The invention may be modified within certain limitations by person skilled in the art without departing from the spirit and intent thereof or the scope of the appended claim.

What is claimed is:

1. In a mock-up unit for erecting a simulated structural frame for product design and engineering, comprising, an elongated tubular member of indeterminate length having an angular transverse section and formed of a fibrous material having the characteristic of heavy cardboard, the said elongated member having end flaps contiguous with opposing sides thereof and extending beyond the ends of said member for attachment to opposing sides of other members of like form in axial alignment therewith or in a variety of angular arrangements with respect to said other members whereby to form said simulated structural frame and fastening means for rigidly associating a plurality of said units in said simulated structural frame.

References Cited

UNITED STATES PATENTS

| | | | |
|---|---|---|---|
| 1,172,560 | 2/1916 | Roth | 229—49 |
| 1,507,793 | 9/1924 | Rappaport et al. | 52—731 X |
| 2,327,529 | 8/1943 | Kieckhefer | 229—51 X |
| 2,634,041 | 4/1953 | Burnett | 229—51 |
| 2,771,234 | 11/1956 | Hultin | 229—51 X |
| 2,802,614 | 8/1957 | Gelin | 206—65 X |

BOBBY R. GAY, *Primary Examiner.*

A. M. CALVERT, *Assistant Examiner.*